United States Patent
Smith, Jr.

(10) Patent No.: US 11,993,204 B2
(45) Date of Patent: May 28, 2024

(54) VEHICLE AND PEDESTRIAN ALERT SYSTEM AND VEHICLE INCLUDING AN ALERT SYSTEM

(71) Applicant: Ronald E. Smith, Jr., Philadelphia, PA (US)

(72) Inventor: Ronald E. Smith, Jr., Philadelphia, PA (US)

( * ) Notice: Subject to any disclaimer, the term of this patent is extended or adjusted under 35 U.S.C. 154(b) by 0 days.

(21) Appl. No.: 17/560,748

(22) Filed: Dec. 23, 2021

(65) Prior Publication Data

US 2022/0203889 A1    Jun. 30, 2022

Related U.S. Application Data

(60) Provisional application No. 63/130,488, filed on Dec. 24, 2020.

(51) Int. Cl.
| | | |
|---|---|---|
| B60Q 1/50 | (2006.01) | |
| B60Q 5/00 | (2006.01) | |
| B62D 1/04 | (2006.01) | |
| H04W 4/40 | (2018.01) | |
| H04W 4/90 | (2018.01) | |

(52) U.S. Cl.
CPC ............ *B60Q 1/525* (2013.01); *B60Q 5/006* (2013.01); *B62D 1/046* (2013.01); *H04W 4/40* (2018.02); *H04W 4/90* (2018.02)

(58) Field of Classification Search
CPC ......... B60Q 1/525; B60Q 5/006; H04W 4/90; H04W 4/40
See application file for complete search history.

(56) References Cited

U.S. PATENT DOCUMENTS

| | | | |
|---|---|---|---|
| 4,262,277 A * | 4/1981 | Abonia | B60Q 1/52 340/474 |
| 4,871,991 A | 10/1989 | Noda et al. | |
| 5,331,124 A | 7/1994 | Danielson | |
| 5,398,962 A | 3/1995 | Kropp | |
| 5,965,952 A | 10/1999 | Podoloff et al. | |
| 6,457,379 B1 | 10/2002 | Mirone | |
| 8,003,902 B1 * | 8/2011 | Cannella | B60Q 5/001 200/61.54 |
| 8,581,126 B1 * | 11/2013 | Cannella | B60Q 1/444 200/61.54 |
| 9,457,714 B1 | 10/2016 | Lazarini | |
| RE46,495 E * | 8/2017 | Cannella | B60Q 1/444 |
| 9,796,441 B1 * | 10/2017 | Roshandel | B62J 6/057 |
| 10,282,996 B1 * | 5/2019 | Buchbut | G08G 1/164 |
| 10,713,502 B2 * | 7/2020 | Tiziani | G06V 40/172 |
| 2008/0055066 A1 * | 3/2008 | Griffin | B60Q 1/46 340/474 |
| 2011/0319051 A1 | 12/2011 | Reitnour | |
| 2012/0164968 A1 | 6/2012 | Velusamy et al. | |
| 2014/0056441 A1 * | 2/2014 | Chhaunker | B60Q 5/00 381/107 |
| 2014/0308915 A1 | 10/2014 | Reitnour et al. | |

(Continued)

*Primary Examiner* — Hoi C Lau
(74) *Attorney, Agent, or Firm* — Volpe Koenig

(57) ABSTRACT

A vehicle alert system and method are provided. The vehicle alert system and method provide for a non-audible alert upon actuation of an actuation area, such as a car horn. The non-audible alert may include operating or actuating one or more lights. A mobile application may be provided for providing an alert in response to the actuation of the actuation area.

16 Claims, 8 Drawing Sheets

(56) References Cited

U.S. PATENT DOCUMENTS

| | | | |
|---|---|---|---|
| 2016/0059777 A1* | 3/2016 | Malone | B60K 35/00 |
| | | | 340/426.1 |
| 2016/0231746 A1* | 8/2016 | Hazelton | G05D 1/0274 |
| 2016/0355179 A1* | 12/2016 | Cannella | B60T 17/22 |
| 2017/0309178 A1* | 10/2017 | Hernandez | G08G 1/163 |
| 2018/0072269 A1* | 3/2018 | Tong | B60R 25/305 |
| 2019/0073641 A1* | 3/2019 | Utke | G06V 20/00 |
| 2019/0166457 A1 | 5/2019 | Lipowski et al. | |
| 2019/0188493 A1* | 6/2019 | Tiziani | G06V 40/10 |
| 2019/0197325 A1* | 6/2019 | Reiley | G08B 13/19602 |
| 2020/0094709 A1* | 3/2020 | Dutkin | G08B 21/22 |
| 2020/0290430 A1* | 9/2020 | Neveu | B60H 1/2218 |
| 2020/0342241 A1* | 10/2020 | Tiziani | G06V 20/56 |
| 2020/0361370 A1* | 11/2020 | Wescott | B60Q 1/525 |
| 2021/0197719 A1* | 7/2021 | Williams | B60Q 1/52 |
| 2021/0209386 A1* | 7/2021 | Remijn | G01S 13/931 |
| 2022/0105889 A1* | 4/2022 | Scappaticci | B60R 21/01 |
| 2022/0203889 A1* | 6/2022 | Smith, Jr. | B60Q 5/00 |
| 2022/0229432 A1* | 7/2022 | Van Wiemeersch | |
| | | | B62D 15/0285 |
| 2022/0234604 A1* | 7/2022 | Feldkamp | B60W 50/14 |
| 2022/0355752 A1* | 11/2022 | Williams | B60Q 5/001 |

\* cited by examiner

VEHICLE AND PEDESTRIAN ALERT SYSTEM AND VEHICLE INCLUDING AN ALERT SYSTEM

CROSS REFERENCE TO RELATED APPLICATION(S)

This application claims the benefit of U.S. Provisional Application No. 63/130,488, filed on Dec. 24, 2020, the entire contents of which are hereby incorporated by reference as if fully set forth herein

FIELD OF INVENTION

This invention is directed to the field of safety, and in particular, to the field of vehicle safety as it relates to alerting vehicles and pedestrians.

BACKGROUND

Particularly where most people now have smartphones or are otherwise distracted when walking, pedestrians at times are not aware of their surroundings. Thus, a person wearing headphones and talking on the phone or listening to music, or checking their smartphone apps, will not hear vehicles around them. This can lead to a dangerous situation, such as wandering into traffic.

In addition, those with hearing issues may not be able to hear warnings from vehicles, such as horn honking.

Further, people driving vehicles may not hear other vehicles or vehicle horns, as they may be listening to loud music or talking on the phone.

Accordingly, there is a need for a safety system that is not based solely on an audio alert from the horn system of an automobile.

SUMMARY OF THE INVENTION

According to aspects of the invention, a vehicle alert system is provided, comprising a non-audible alert configured to alert a pedestrian or vehicle. The non-audible alert may be provided by one or more visual alert devices provided at one or more selected locations of a vehicle. The non-audible or visual alert device may comprise one or more lights. The non-audible or visual alert device may be actuated by pressing an actuation area. The actuation area may comprise a portion of a vehicle steering wheel or horn or horn system. In an aspect, actuation of a vehicle alert system transmits a signal. In an aspect, the system may further comprise a mobile application or "app" configured to provide an alert on a device in response to the signal transmitted by the vehicle alert system.

According to further aspect, a vehicle alert system for a vehicle, is provided, comprising an actuation area, and a non-audible alert device in communication with the actuation area. The non-audible alert device may be positioned so as to be viewed from outside (exterior to) the vehicle and configured to be actuated upon actuation of the actuation area and to thereby produce a non-audible alert.

According to an aspect of the invention, the vehicle alert system may comprise a steering wheel, and the steering wheel may comprise the actuation area. The actuation area may be positioned on, about, or integrated into, the vehicle steering wheel.

According to an aspect of the invention, the actuation area may comprise a pad, button, level, or switch.

According to an aspect of the invention, the non-audible alert device may be positioned on an exterior of a vehicle, or visible to a viewer exterior to a vehicle.

According to an aspect of the invention, the non-audible alert device may comprise one or more lights.

According to an aspect of the invention, the one or more lights have at least a portion facing a forward direction of a vehicle.

According to an aspect of the invention, the non-audible alert device is part of or otherwise connected or coupled to a vehicle horn system.

According to an aspect of the invention, a mobile application is provided, the mobile application configured to provide an alert to a user of a mobile device. The alert is preferably in response to a signal transmitted upon actuation of the actuation area.

According to an aspect of the invention, a method for providing a non-audible alert to a pedestrian or vehicle is provided the method comprising: providing an actuation area positioned within an interior of a vehicle; providing a non-audible alert device in communication with the actuation area; transmitting a signal to the non-audible alert device in response to actuation of the actuation area; and providing a non-audible alert in response to the signal. The actuation area may comprise a pad, button, level, or switch.

According to an aspect of the invention the method may further comprising providing a mobile device comprising a mobile application; and providing an alert via the mobile application in response to actuation of the actuation area.

The alert systems described herein may be vehicle to pedestrian alerts, and/or vehicle to vehicle alerts.

DESCRIPTION OF THE INVENTION

Figure 1:
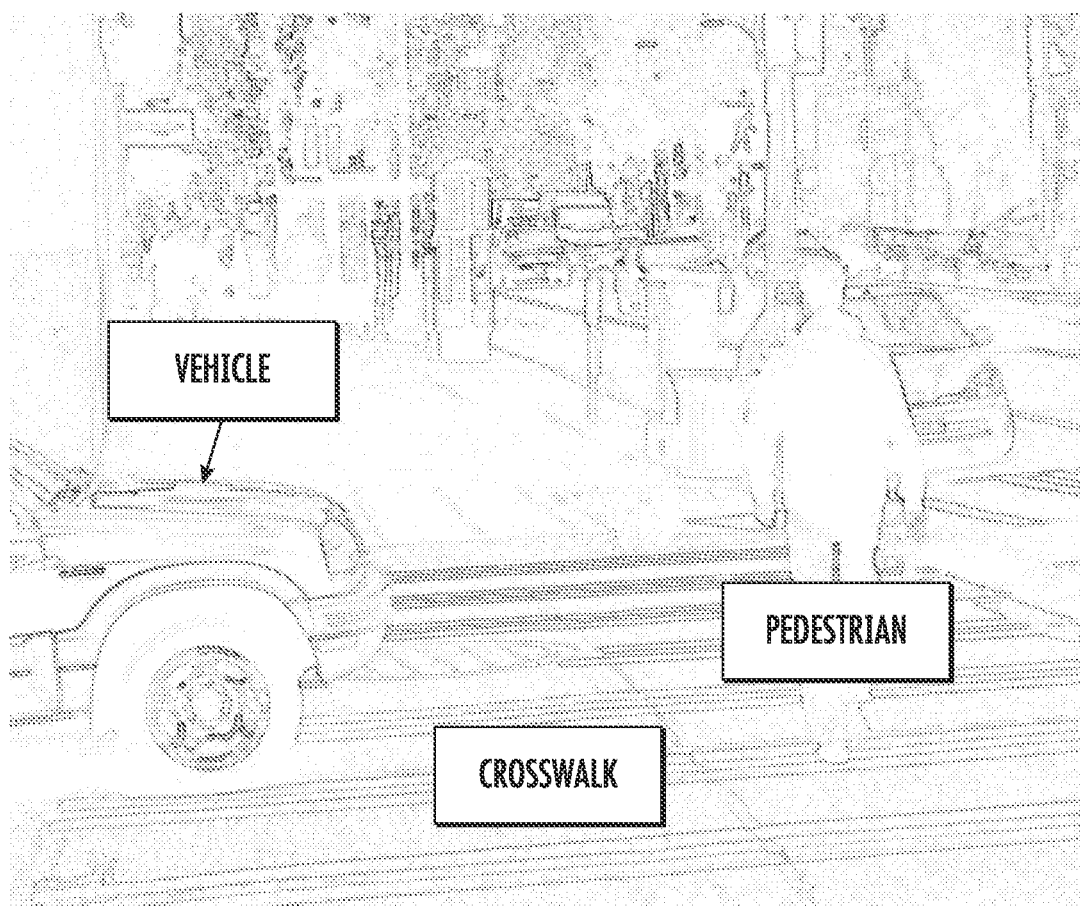
FIG. 1 illustrates an image of a vehicle and a pedestrian crossing a street.

Reference will now be made in detail to various embodiments of the invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth to provide a thorough understanding of the invention. However, it will be recognized by one of ordinary skill in the art that the invention may be practiced without these specific details.

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B or C as well as any combination thereof. It may be noted that some figures are shown with partial transparency for the purpose of explanation, illustration and demonstration purposes only, and is not intended to indicate that an element itself would be transparent in its final manufactured form.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The term "software," "program" or "computer software," or "computer program," refer to or comprises any computer software application or combination of computer software applications, comprising sets of coded instructions that enable a computer to perform desired sequences of operations, and data as required to support those operations. Data may be stored in files, databases, data stores, etc. The computer program can be in any computer language or computer code.

In an aspect of the invention, systems, devices and methods are disclosed that provide for a vehicle alert system, without the use of vehicle's audio horn alert. It is appreciated that such a system can alert either pedestrians and/or other vehicles.

In an aspect of the invention, actuation of a vehicle's horn will provide not only an audio alert but will also provide for a visual alert. The visual alert preferably comprises a light system in communication with and operative by actuation of the vehicle's horn. The visual alert may comprise one or more lights, such as LED lights, that may flash in a pattern, providing a visual warning that the horn has been actuated. This provides a visual warning to a pedestrian, who may not hear the horn's audio signal, due to a distraction or an impairment. Rather than having a car operator be forced to use a separate means to signal with a visual alert, such as "flicking" the headlights of a car, an alert system as described herein will provide a visual alert when a car operator actuates the same means they would actuate for a car alert such as a horn. Therefore, the present invention takes advantage of a car operator's already trained response for providing an alert. A visual alert may be considered part of or otherwise comprise a non-audio alert or a non-audible alert.

As shown in FIG. 1, a pedestrian may be crossing a street, and a vehicle may be approaching. Assume the pedestrian has, for example, earphones in or on or otherwise covering their ears and is on a phone call, listening to loud music, a podcast, an audio book, etc. In that instance, the sound from the car's horn will not alert the passenger. Even if not covering their ears, pedestrians at times become so absorbed, that they will not hear a car horn. Therefore, some type of visual alert is needed.

In an aspect of the present invention, horn system 11 comprises an actuation area 12 of a vehicle steering wheel 10, and an electrical and/or electronics system 100 for creating an audible warning via the vehicle's horn 13. Such horn systems and vehicle electronics systems are known in the art, and are detailed in such patents as, for example, U.S. Pat. Nos. 4,871,991, 6,457,379, 5,331,124, 5,965,952, 5,398,962, and 9,457,714, the entireties of all of which are incorporated by reference as if fully set forth herein. The various parts, components, or elements of the system are in communication, such as electrical communication or via one or more signals, coupled, or otherwise connected as necessary for accomplishing the aspects as described herein.

The vehicle steering wheel 10 is provided with an actuation area 12 such as a pad or button, which is generally the area of a steering wheel 10 than can be depressed by a driver to actuate the horn 13. Any button accessible to a driver can be used, but it is preferred that the button is within reach of the driver's hand or fingers as already placed on the vehicle steering wheel. The actuation area 12 can be part of one or more of a series of buttons provided on or around a steering wheel, at various positions, as is known in the art with buttons for voice activation, increasing or decreasing vehicle radio volume, changing music channels, etc. The actuation area 12 can be position at any convenient location on or around the steering wheel. The actuation area 12 may be touch sensitive or part of a touch screen.

The actuation area 12 is in communication with, coupled to, or otherwise connected to a visual alert device 14, which may be considered a non-audible alert device. Upon depressing or otherwise operating or moving the actuation area 12, a signal, such as an electrical signal or impulse, is transmitted through the electronics system 100 of the vehicle as is known in the art to actuate the audible horn 13 of the vehicle. According to an aspect of the invention, the signal may also actuate, either automatically or selectively, a visual alert, described in greater detail below, via a vehicle alert device 14.

Figure 2:
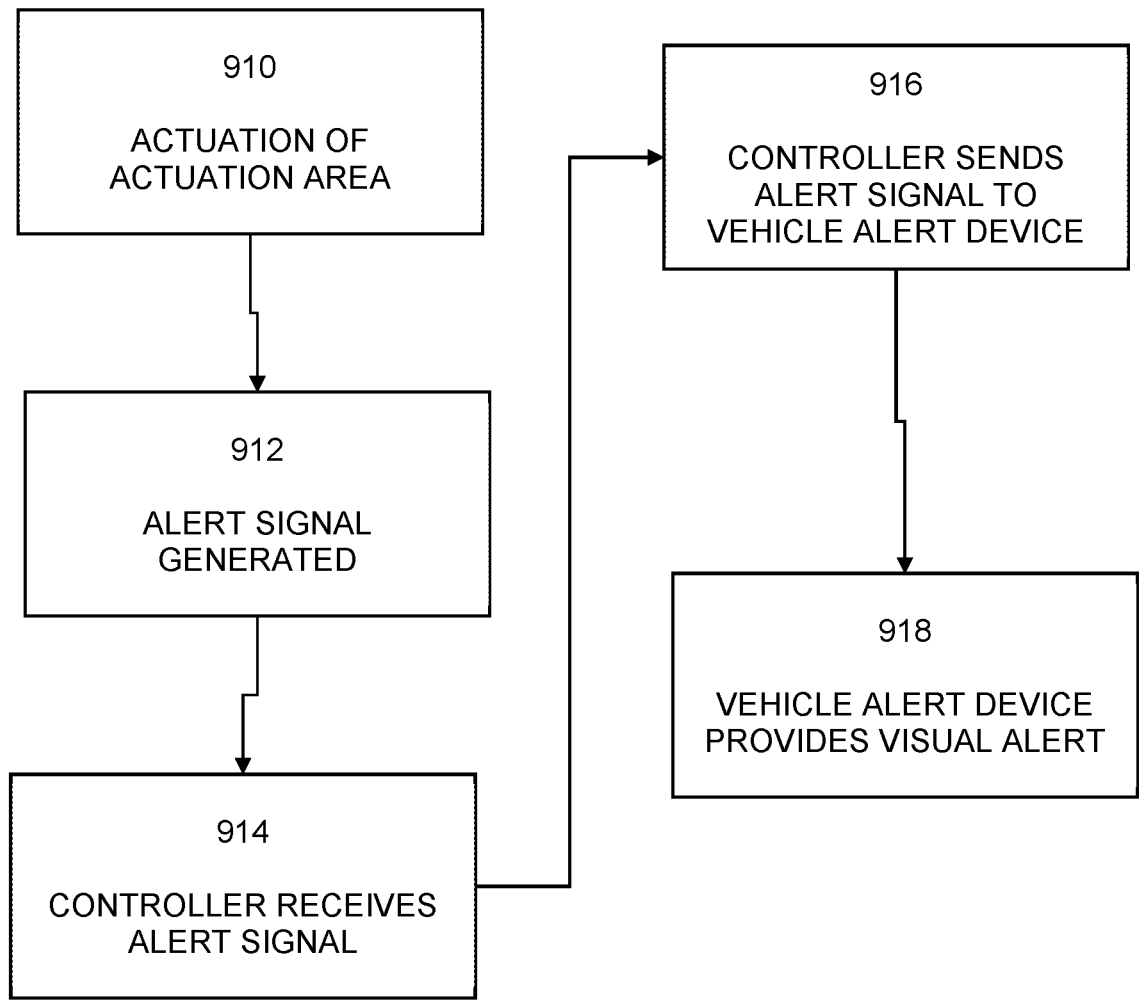
FIG. 2 illustrates a flowchart of an illustrative operation of a pedestrian alert system according to the invention.
Figure 3:
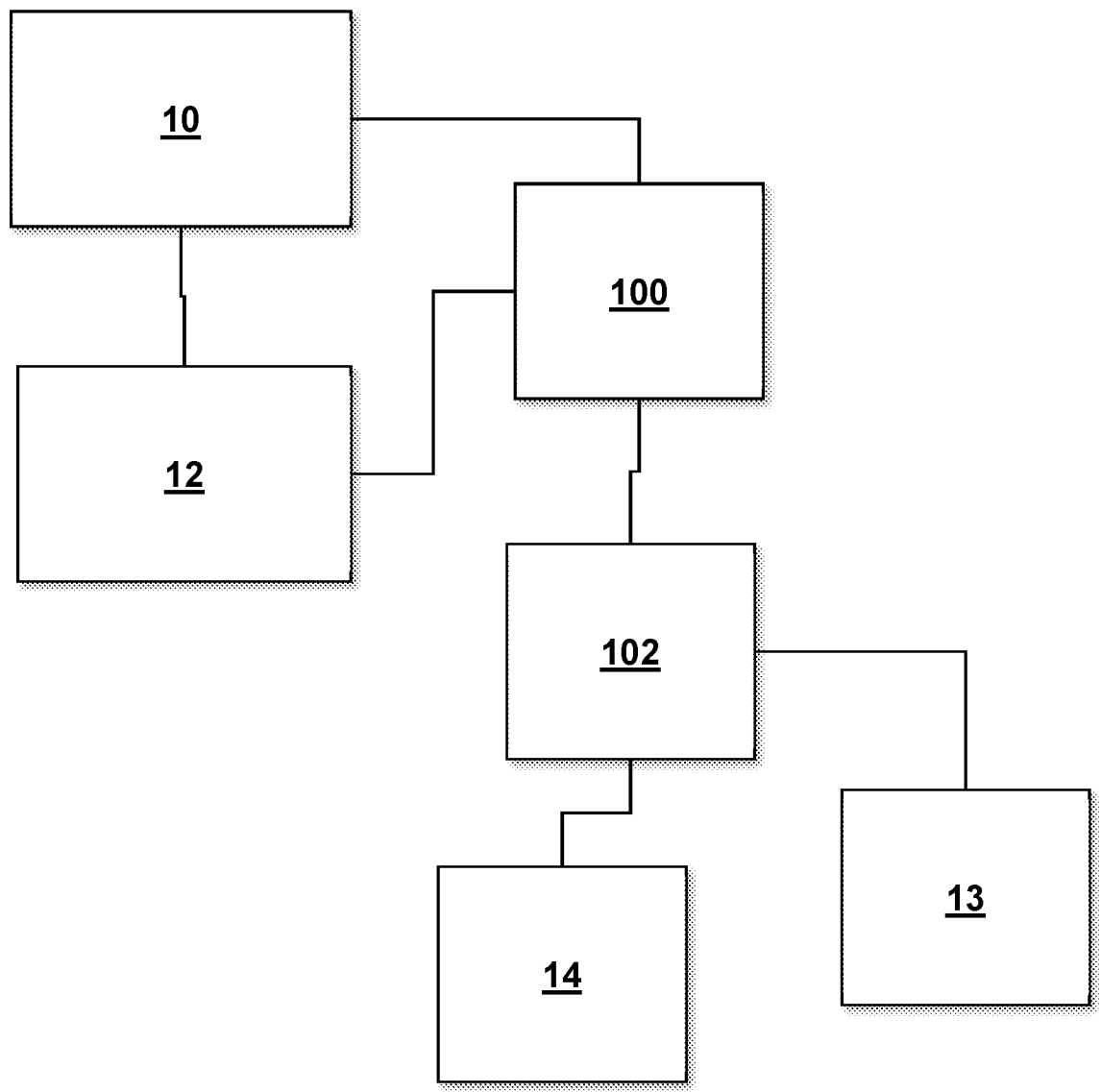
FIG. 3 illustrates a schematic representation of an aspect of an illustrative pedestrian alert system according to the invention.

FIG. 2 is a flowchart illustrating an operation of a system of providing a visual alert to a pedestrian according to an aspect of the invention, and FIG. 3 is a schematic representation of the system. The elements shown and/or described in FIG. 2 may be considered to be coupled, in communication with each other, or otherwise connected.

At step 900, a vehicle horn is activated, such as by touching, actuating, depressing, moving, or otherwise operating the actuation area 12.

In step 910, the actuation area 12 is actuated (e.g., touching, pressing, hitting, pushing).

In step 912, an alert signal 700 is generated in response to the actuation of the actuation area 12 via the electrical or electronics system 100 of the vehicle.

In step 914, a controller 102, which may be considered part of the electrical or electronics system 100 of the vehicle or may otherwise be associated with the vehicle alert device 14, receives the alert signal 700. The controller 102 may be a microcontroller or microprocessor or processor, or otherwise part of a computer system, configured to control the operation of a visual alert device 14 of the vehicle, in addition to other functions. The visual alert device may further be considered a non-audible alert device or a non-audio alert device.

In step 916, the controller 102 sends an alert signal 710 configured to operate the visual alert device 14 of the vehicle.

In step 918, the visual alert device 14 provides a visual alert, such as by flashing, blinking, or otherwise causing a light to shine. In this manner, a pedestrian who cannot otherwise hear the vehicle's horn will see the actuated visual alert device 14, and will be alerted to the oncoming vehicle.

Figure 4A:
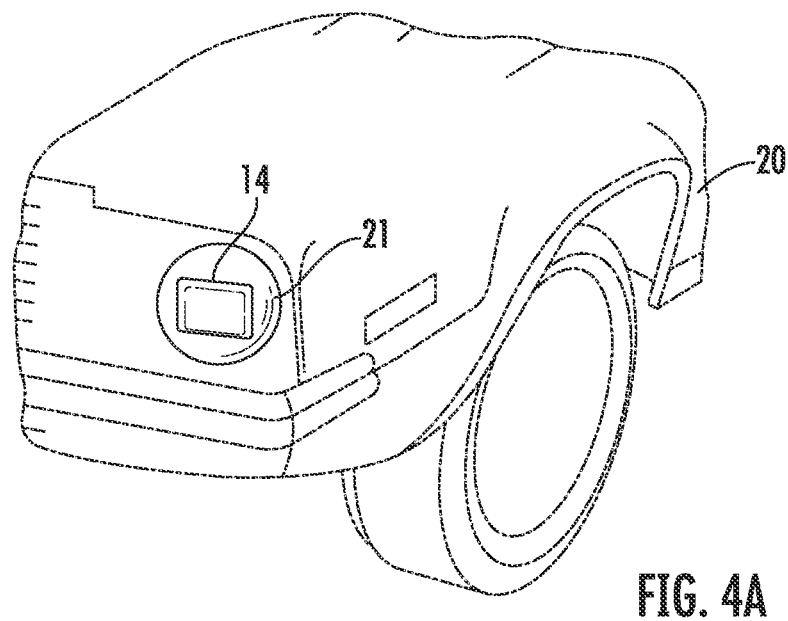
FIGS. 4A and 4B illustrate vehicle alert devices according to various aspects of the invention.
Figure 4B:
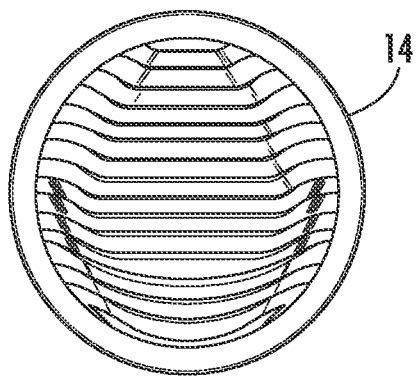

It is appreciated that the horn system 11 will also cause the vehicle's audible horn to produce an audible "honking" sound as well. Thus, a combination of an audio alert and a visual alert may be provided according to one or more aspects of the invention. According to a preferred embodiment, the vehicle horn and visual alert device are actuated at the same time, and/or via the same signal or electronic impulse. In a preferred embodiment, The visual alert device 14 may comprise, for example, at least one light, an extra headlight arrangement, a plurality of lights, or an added LED light. Shown in FIGS. 4A and 4B are various illustrative visual alert devices 14. A vehicle 1 is shown, including an array of headlights, lights, bulbs or lamps 16. The vehicle alert device 14 may comprise any visual means for alerting a pedestrian of a warning. One or more of these headlights or lamps 16 may comprise a visual alert area 14 in communication with the vehicles electronics system 100 and configured to be actuated by a vehicle operator pressing the horn actuation area 12 of the vehicle steering wheel. The visual alert device 14 may be part of the vehicle's headlight system or may be an additional or add-on feature, or an extension thereof. The visual alert device 14 may be located adjacent to or otherwise a part of the headlights 21 of a vehicle 20, or otherwise positioned so as to be seen by a pedestrian.

Figure 5:
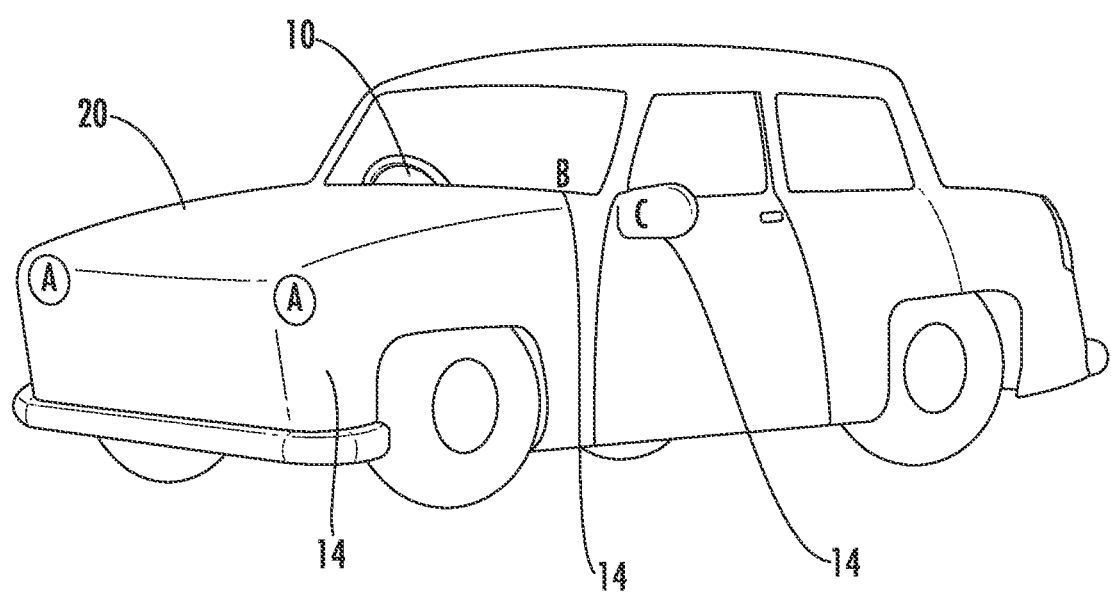
FIG. 5 illustrates a vehicle that may be equipped with a pedestrian alert system according to the invention, including locations and positioning of a vehicle alert device.
Figure 6:
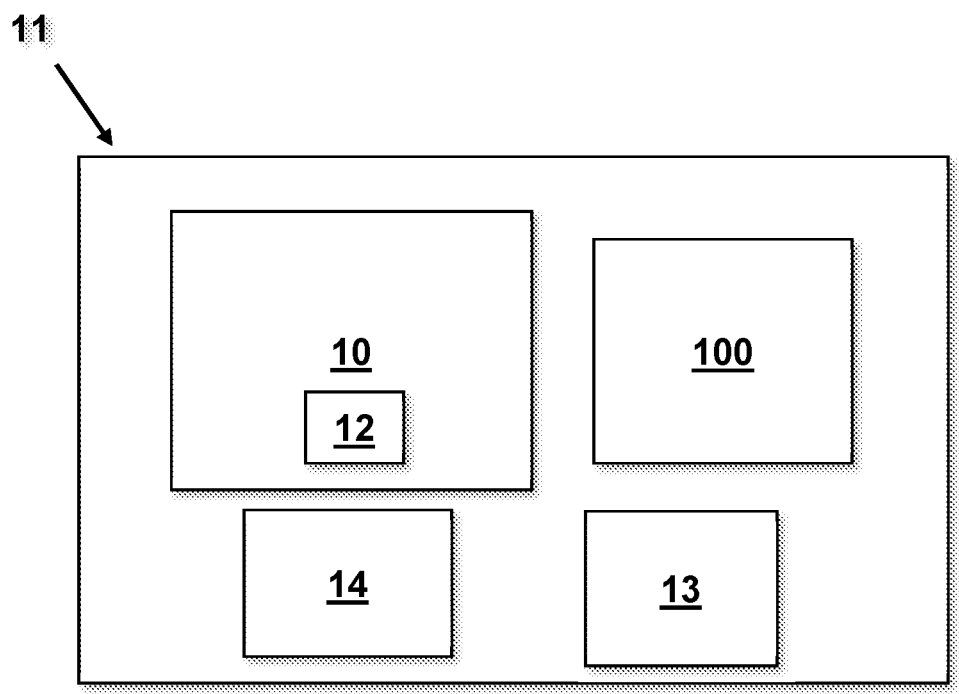
FIG. 6 illustrates schematically a vehicle horn system comprising components of a pedestrian alert system according to the invention.
Figure 7:
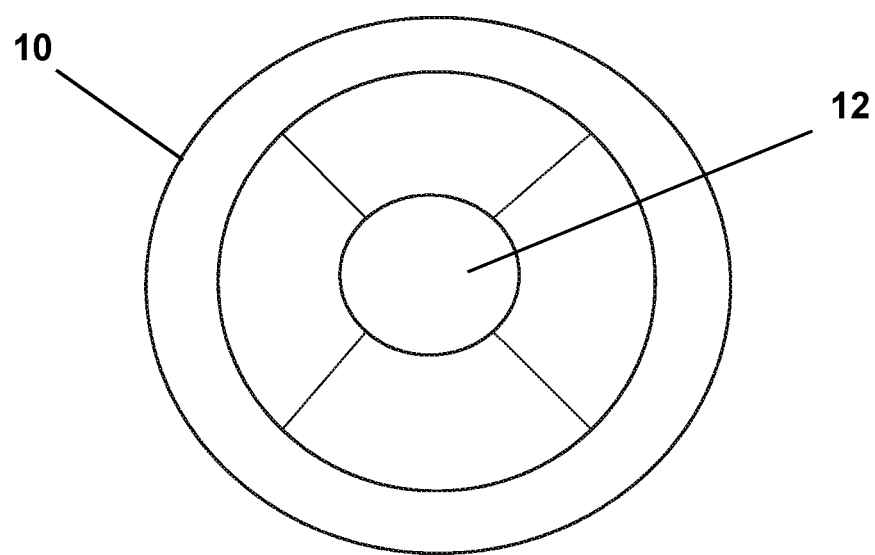
FIG. 7 illustrates a vehicle steering wheel and actuation area.

The visual alert device 14 may preferably be positioned at or adjacent to various areas or positions on the front-facing or front-viewable part of the vehicle, such as in positions A, B or C of FIG. 5. It is appreciated, however, that the visual alert device 14 may be positioned at any location that could provide a visual alert to a pedestrian. In addition, it is appreciated that a plurality of vehicle alert devices may be provided at areas around the perimeter of the vehicle or otherwise, such as on the front, sides, and back. There is no limit to the positioning of the visual alert device or plurality of visual alert devices. It is preferred that the visual alert device is positioned in one or more positions where a pedestrian will or is likely to see a visual alert produced according to the system.

An electronic controller 104 may be provided as part of the electronics system 102 of the vehicle that is configured to control the operation of the vehicle alert device 14. Upon receipt of a signal from the actuation area 12, the controller is configured to operate the vehicle alert device 14. This may take the form of blinking the lights of the vehicle alert device 14, pulsing the lights of the vehicle alert device 14, strobing the lights of the vehicle alert device 14, alternating the lights of the vehicle alert device 14, or any other pattern. This creates a visual alert to accompany the audio alert of the vehicle horn, for example.

Figure 8:
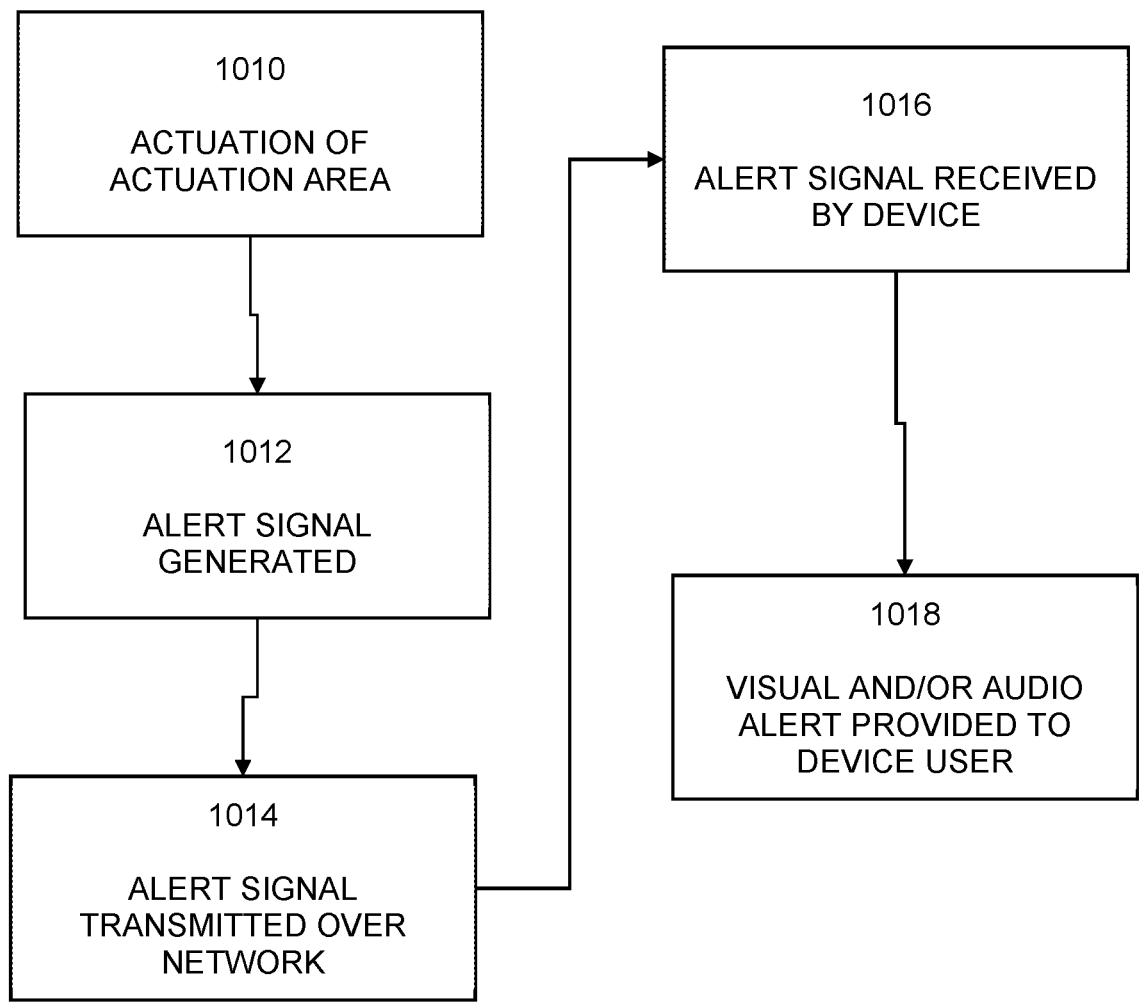
FIG. 8 illustrates a flowchart of an illustrative operation of a pedestrian alert system according to the invention in connection with a smartphone application.

In another an aspect of the invention, as shown in FIG. 8, a vehicle alert system is equipped with a system for activating a warning alert on a pedestrian's electronic device, such as a smartphone, notebook, computer, laptop, or other cellular or WiFi device. The smartphone is equipped with software (an "app" or application or mobile application, or software) allowing for receipt of a signal that provides in response a visual, physical, or audio alert. Examples of mobile device alert systems are described in, for example, U.S. Patent Publication No. 20190166457, U.S. Patent Publication No. 20120164968, U.S. Patent Publication No. 20110319051, U.S. Patent Publication No. 20120164968, U.S. Patent Publication No. 20140308915, and the entire contents of all of which are incorporated by reference as if fully set forth herein.

According to this aspect, a vehicle comprises a transmitter connected to and operative by actuating the horn or horn system of the vehicle.

At step 1010, the vehicle horn is activated. It is noted that this step may be optional, and a non-audible alert may be transmitted with no audible alert.

At step 1012, activating the horn generates an alert signal, that may be a radio, Bluetooth, WiFi, cellular, broadband, or other signal, or transmitted by one or more of such wireless transmission functionalities.

At step 1014, the signal is transmitted over a network (e.g., wireless carrier, broadband, cellular) by a transmitter to a smartphone or other device, such as a mobile device. In addition, the signal may be transmitted over a network to the computer or cellular system of another vehicle, whereby the other vehicle may have a screen that may act as a mobile device ad provide an alert according to aspects hereof.

At step 1016, the alert signal is received by the device. The device, such as a smartphone, comprises a receiver to receive the signal.

An application, mobile applicable or "app," which generally comprises a computer software program or other code for processing the signal and includes a microprocessor. The software determines whether a signal indicates that the car horn has been actuated.

At step 1018, the software is configured to provide a pedestrian alert via the audio system and/or visual display of the smartphone.

In addition, most smartphones or other mobile devices comprise a display with various notification methods, such as pop-up notification, notifications on a smartphone lock screen, etc. Receipt of the signal may cause the smartphone to display such a notification. In this way, a pedestrian who either cannot hear the car horn, or is staring at their phone, is alerted to a potentially oncoming vehicle or other danger.

For example, most smartphones comprise a vibration or vibrator system as is well known in the field of smartphones, which causes the smartphone to vibrate when a call is received, or another type alert is received. Receipt of the signal may cause the smartphone to vibrate. In this way, a pedestrian who either cannot hear the car horn, or is staring at their smartphone, is alerted to a potentially oncoming vehicle or other danger. A vibration system or signal may be considered part of a non-audible or non-audio alert.

Any reference herein to a smartphone further contemplates a device such as a similar mobile device, including, but not limited to, a laptop, tablet, pad such as an iPad, or the on-board electronics or computerized system of a vehicle.

A pedestrian may selectively set the software of the smartphone to provide one or more of the alerts and/or notifications. Such notification control is known in the art of devices.

While some examples described herein focus on alerting a pedestrian, it is appreciated that the alert systems and devices of the present application can be applied to vehicle-to-vehicle alerts, where a first vehicle alerts a second vehicle, with or without an audible alert. For example, and not by way of limitation, a first vehicle can alert a second vehicle via an alert such as a sound, vibration, display of an alert on a screen of the vehicle, or actuation of a light in the vehicle.

One or more aspects of the invention can be implemented by is implemented a computer program, comprising software application and data files. The computer program may be stored on at least one computer that may comprise a processing unit or CPU, with a memory capacity for storing the information gathered by the system, which can be through various technical means as will be appreciated by those in the art. The computer program may be accessible by users of the system through a user interface, such as a personal computer terminal having a CPU, keyboard, monitor and mouse, or thin client server comprising a terminal with a keyboard, monitor and mouse. It is understood that a computer can include a laptop, tablet, smartphone, mobile device, etc.

The functions described may be implemented in hardware, software, firmware, or any combination thereof. As software, the functions may be stored as instructions on a tangible computer-readable medium. A storage medium may be any available tangible medium that can be accessed by a computer. By way of example, and not limitation, such computer-readable media can comprise EEPROM, RAM, ROM, or other disk storage, or any other tangible medium that can be used hold or store program code.

A computer program may perform operations or functions described. A computer program may be a computer readable tangible medium having instructions tangibly stored or encoded thereon. The instructions are executable by one or more processors to perform the functions or operations described herein. Software or instructions may also be transmitted over a transmission medium, such as a wired or wireless technology such as Bluetooth, WiFi, or otherwise.

It will be appreciated that the foregoing is presented by way of illustration only and not by way of any limitation. It is contemplated that various alternatives and modifications may be made to the described embodiments without departing from the spirit and scope of the invention. Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A vehicle alert system for warning a pedestrian of a vehicle approaching the pedestrian, comprising:
    a vehicle horn system comprising a steering wheel including an actuation area, the actuation area configured to produce a signal upon actuation of the actuation area;
    a non-audible alert device in communication with the actuation area, the non-audible alert device positioned so as to be viewed from outside the vehicle and configured to be actuated upon actuation of the actuation area and to thereby produce a non-audible alert; and
    a mobile device comprising a mobile application, the mobile application configured to provide a warning alert to a user of the mobile device in response to the signal produced upon actuation of the actuation area, wherein the warning alert is configured to warn the pedestrian of the vehicle approaching the pedestrian.

2. The vehicle alert system of claim 1, wherein the mobile device comprises a smartphone, and wherein the warning alert comprises a notification on a screen of the smartphone.

3. The vehicle alert system of claim 1, wherein the actuation area comprises a pad, button, level, or switch.

4. The vehicle alert system of claim 1, wherein the non-audible alert device is positioned on an exterior of a vehicle.

5. The vehicle alert system of claim 1, wherein the non-audible alert device comprises one or more lights.

6. The vehicle alert system of claim 5, wherein the one or more lights have at least a portion facing a forward direction of the vehicle.

7. A method for providing a non-audible alert and an electronic warning alert to a pedestrian comprising:
    providing a vehicle horn system comprising a steering wheel including an actuation area positioned within an interior of a vehicle;
    providing a non-audible alert device in communication with the actuation area;
    providing a mobile application configured for use by the pedestrian via a mobile device configured to in communicate with the actuation area;
    transmitting one or more signals to the non-audible alert device and the mobile device in response to actuation of the actuation area;
    providing a non-audible alert in response to the one or more signals via the non-audible alert device; and
    providing a warning alert via the mobile application to the pedestrian in response to the one or more signals, wherein the warning alert is configured to warn the pedestrian of the vehicle approaching the pedestrian.

8. The method of claim 7, wherein the vehicle further comprises a horn, and wherein actuation of the actuation area further actuates the horn.

9. The method of claim 7, wherein the mobile device comprises a smartphone, and wherein the warning alert comprises a notification on a screen of the smartphone.

10. The method of claim 7, wherein the actuation area comprises a pad, button, level, or switch.

11. The method of claim 7, wherein the non-audible alert device is positioned facing an exterior of a vehicle.

12. The method of claim 7, wherein the non-audible alert device comprises one or more lights.

13. The method of claim 12, wherein the one or more lights have at least a portion facing a forward direction of a vehicle.

14. The method of claim 7, wherein a vehicle horn system comprises the non-audible alert device.

15. The vehicle alert system of claim 1, wherein the mobile device is configured to vibrate in response to the warning alert.

16. The method of claim 7, wherein the mobile device is configured to vibrate in response to the warning alert.

* * * * *